(12) United States Patent
Wang

(10) Patent No.: US 10,467,743 B1
(45) Date of Patent: Nov. 5, 2019

(54) IMAGE PROCESSING METHOD, TERMINAL AND STORAGE MEDIUM

(71) Applicant: Shenzhen Intellifusion Technologies Co., Ltd., Shenzhen (CN)

(72) Inventor: Donglu Wang, Shenzhen (CN)

(73) Assignee: SHENZHEN INTELLIFUSION TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/461,789

(22) PCT Filed: Nov. 15, 2017

(86) PCT No.: PCT/CN2017/111176
§ 371 (c)(1),
(2) Date: May 16, 2019

(87) PCT Pub. No.: WO2018/090937
PCT Pub. Date: May 24, 2018

(30) Foreign Application Priority Data

Nov. 18, 2016 (CN) .......................... 2016 1 1026182

(51) Int. Cl.
| | | |
|---|---|---|
| *G06T 1/00* | (2006.01) | |
| *G06T 7/00* | (2017.01) | |
| *G06T 7/10* | (2017.01) | |
| *G06F 17/16* | (2006.01) | |
| *G06T 5/50* | (2006.01) | |
| *G06F 7/00* | (2006.01) | |

(52) U.S. Cl.
CPC ............ *G06T 7/0002* (2013.01); *G06F 17/16* (2013.01); *G06T 5/50* (2013.01); *G06T 7/10* (2017.01); *G06T 2207/30201* (2013.01)

(58) Field of Classification Search
CPC .... G06T 3/00; A63F 7/00; H04N 1/00; G06F 7/00
USPC ......................................................... 382/100
See application file for complete search history.

(56) References Cited

U.S. PATENT DOCUMENTS

2009/0180671 A1    7/2009 Lee et al.

FOREIGN PATENT DOCUMENTS

| CN | 103679158 A | 3/2014 |
|---|---|---|
| CN | 105138972 A | 12/2015 |

(Continued)

OTHER PUBLICATIONS

International Search Report for PCT/CN2017/111176.
(Continued)

*Primary Examiner* — Abolfazl Tabatabai

(57) ABSTRACT

An image processing method, a terminal and a storage medium. The method includes: acquiring N target image, wherein each of the target images contains a face image, and N is an integer greater than one (101); determining a covariance matrix of the N target image (102); determining an upper information entropy limit according to the covariance matrix (103); determining whether the upper information entropy limit is greater than a first pre-set threshold value (104); when the upper information entropy limit is greater than the first pre-set threshold value, determining that the N target images contain face images of different people (105); and when the upper information entropy limit is less than or equal to the first pre-set threshold value, determining that the N target images contain face images of the same person (106).

11 Claims, 5 Drawing Sheets

(56) References Cited

FOREIGN PATENT DOCUMENTS

| CN | 105550657 A | 5/2016 |
|---|---|---|
| CN | 106845331 A | 6/2017 |

OTHER PUBLICATIONS

International Publication for PCT/CN2017/111176.
Written Opinion of the International Searching Authority for PCT/CN2017/111176.

IMAGE PROCESSING METHOD, TERMINAL AND STORAGE MEDIUM

CROSS-REFERENCE TO RELATED APPLICATIONS

This application claims the benefit of priority from Chinese Patent Application NO. 201611026182.5 entitled "AN IMAGE PROCESSING METHOD AND A TERMINAL" and filed on Nov. 18, 2016, the content of which is hereby incorporated in its entire by reference.

FIELD

The present disclosure relates to image processing technical field, and more particularly, to an image processing method, a terminal and a storage medium.

BACKGROUND

With the rapid development of information technology, face recognition technology has been widely used in video monitoring field. In the field of face recognition application, the accuracy of face detection, as the first step during the face recognition application has a great impact on the performance of face recognition. The face detection needs to be strong robustness, because in practical applications, face images are often affected by a variety of factors, such as illumination, occlusion of light, attitude change, etc. The face detection is the most frequently invoked during face recognition process, so the face detection needs to be able to be executed efficiently. Face detection technology can be realized mainly based on the characteristics of manual design, such as Haar characteristics, LBP (Local Binary Patterns) histogram characteristics, HOG (histogram of oriented gradient) characteristics, etc. The computing time of the characteristics can be accepted, and satisfactory results can be obtained in practical applications, so the characteristics above-mentioned are widely used. However, in the existing technology, it is unable to determine whether the faces in a group of images are from the same person.

SUMMARY

Exemplary embodiments of the present disclosure provide an image processing method, a terminal and a storage medium, which can be determined whether the faces in a group of images are from the same person.

According to a first aspect of the invention, it provides an image processing method, the method includes:

acquiring N target images, wherein each of the target images includes a face image, and N is an integer greater than one;

determining a covariance matrix of the N target images;

determining an upper information entropy limit according to the covariance matrix;

determining whether the upper information entropy limit is greater than a first pre-set threshold value;

determining that the N target images include face images of different people when the upper information entropy limit is greater than the first pre-set threshold value; and determining that the N target images include face images of the same person when the upper information entropy limit is less than or equal to the first pre-set threshold value.

In combination with the first aspect, in a first possible embodiment of the first aspect, the step of determining a covariance matrix of the N target images, includes:

extracting feature data of each target image in the N target images respectively to obtain N feature data;

calculating the covariance matrix according to the N feature data.

In combination with the first aspect, in a second possible embodiment of the first aspect, the step of determining a covariance matrix of the N target images, includes:

carrying out target segmentation for the N target images respectively to obtain the N face images;

determining the covariance matrix of the N face images.

In combination with the first aspect or the first or the second possible embodiment of the first aspect, in a third possible embodiment of the first aspect, the step of acquiring N target images, includes:

acquiring N second images;

determining an image quality evaluation value of each of the N second images to obtain N image quality evaluation values;

performing image enhancement processing on the second images whose image quality evaluation values are less than a second pre-set threshold value, and keeping the second images whose image quality evaluation values are greater than or equal to the second pre-set threshold value to obtain the N target images.

In combination with the first aspect or the first or the second possible embodiment of the first aspect, in a fourth possible embodiment of the first aspect, the step of acquiring N target images, includes:

acquiring M first images, wherein M is a positive integer;

performing image segmentation on the M first images to obtain the N target images.

In combination with the first aspect or the first or the second possible embodiment of the first aspect, in a fifth possible embodiment of the first aspect, the N target images correspond to a target tag;

after the step of determining an upper information entropy limit according to the covariance matrix, the method further includes:

evaluating the accuracy of the target tag according to the upper information entropy limit.

In combination with the fifth possible of the first aspect, in a sixth possible embodiment of the first aspect, after the step of evaluating the accuracy of the target tag according to the upper information entropy limit, the method further includes:

deleting the N target images when the accuracy is lower than a third pre-set threshold value;

retaining the N target images when the accuracy is higher than or equal to the third pre-set threshold value.

According to a second aspect of the invention, it provides a terminal, the terminal includes:

an acquiring unit, configured to acquire N target images, wherein each of the target images comprises a face image, and N is an integer greater than one;

a first determining unit, configured to determine a covariance matrix of the N target images;

a second determining unit, configured to determine an upper information entropy limit according to the covariance matrix;

a judging unit, configured to determine whether the upper information entropy limit is greater than a first pre-set threshold value;

a third determining unit, configured to determine that the N target images include face images of different people when the judging unit 304 determines that the upper information entropy limit is greater than the first pre-set threshold value;

the third determining unit, further configured to determine that the N target images include face images of the same person when the judging unit 304 determines that the upper information entropy limit is less than or equal to the first pre-set threshold value.

In combination with the second aspect, in a first possible embodiment of the second aspect, the first determining unit includes:

an extracting module, configured to extract feature data of each target image in the N target images respectively to obtain N feature data;

a calculating module, configured to calculate the covariance matrix according to the N feature data.

In combination with the second aspect, in a second possible embodiment of the second aspect, the first determining unit includes:

a first segmenting module, configured to segment the N target images respectively to obtain the N face images;

a first determining module configured to determine the covariance matrix of the N face image.

In combination with the second aspect or the first or the second possible embodiment of the second aspect, in a third possible embodiment of the second aspect, the acquiring unit includes:

a first acquiring module, configured to acquire M first images, wherein M is a positive integer;

a second segmenting module, configured to perform image segmentation on the M first images to obtain the N target images.

In combination with the second aspect or the first or the second possible embodiment of the second aspect, in a fourth possible embodiment of the second aspect, the acquiring unit includes:

a second acquiring module, configured to acquire N second images;

a second determining module, configured to determine an image quality evaluation value of each of the N second images to obtain N image quality evaluation values;

a processing module, configured to perform image enhancement processing on the second images whose image quality evaluation values are less than a second pre-set threshold value, and keeping the second images whose image quality evaluation values are greater than or equal to the second pre-set threshold value to obtain the N target images.

In combination with the second aspect or the first or the second possible embodiment of the second aspect, in a fifth possible embodiment of the second aspect, the N target images correspond to a target tag;

the terminal further includes:

an assessment unit, configured to evaluate the accuracy of the target tag according to the upper information entropy limit after the judging unit determines the upper information entropy limit according to the covariance matrix.

In combination with the fifth possible embodiment of the second aspect, in a sixth possible embodiment of the second aspect, the terminal further includes:

a processing unit, configured to delete the N target images when the accuracy is lower than a third pre-set threshold value, and retain the N target images when the accuracy is higher than or equal to the third pre-set threshold value after the assessment unit evaluates the accuracy of the target tag according to the upper information entropy limit.

The embodiments of the disclosure have the following beneficial effects:

the image processing method of the embodiment includes: acquiring N target images, wherein each of the target images includes a face image, and N is an integer greater than one; determining a covariance matrix of the N target images; determining an upper information entropy limit according to the covariance matrix; determining whether the upper information entropy limit is greater than a first pre-set threshold value; when the upper information entropy limit is greater than the first pre-set threshold value, determining that the N target images include face images of different people; when the upper information entropy limit is less than or equal to the first pre-set threshold value, determining that the N target images include face images of the same person. By means of the method, it can be determined whether the faces in a group of images are from the same person.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the invention, for persons of ordinary skills in this field, other drawings can be obtained according to the drawings below on the premise of no creative work.

DETAILED DESCRIPTION

Figure 1:
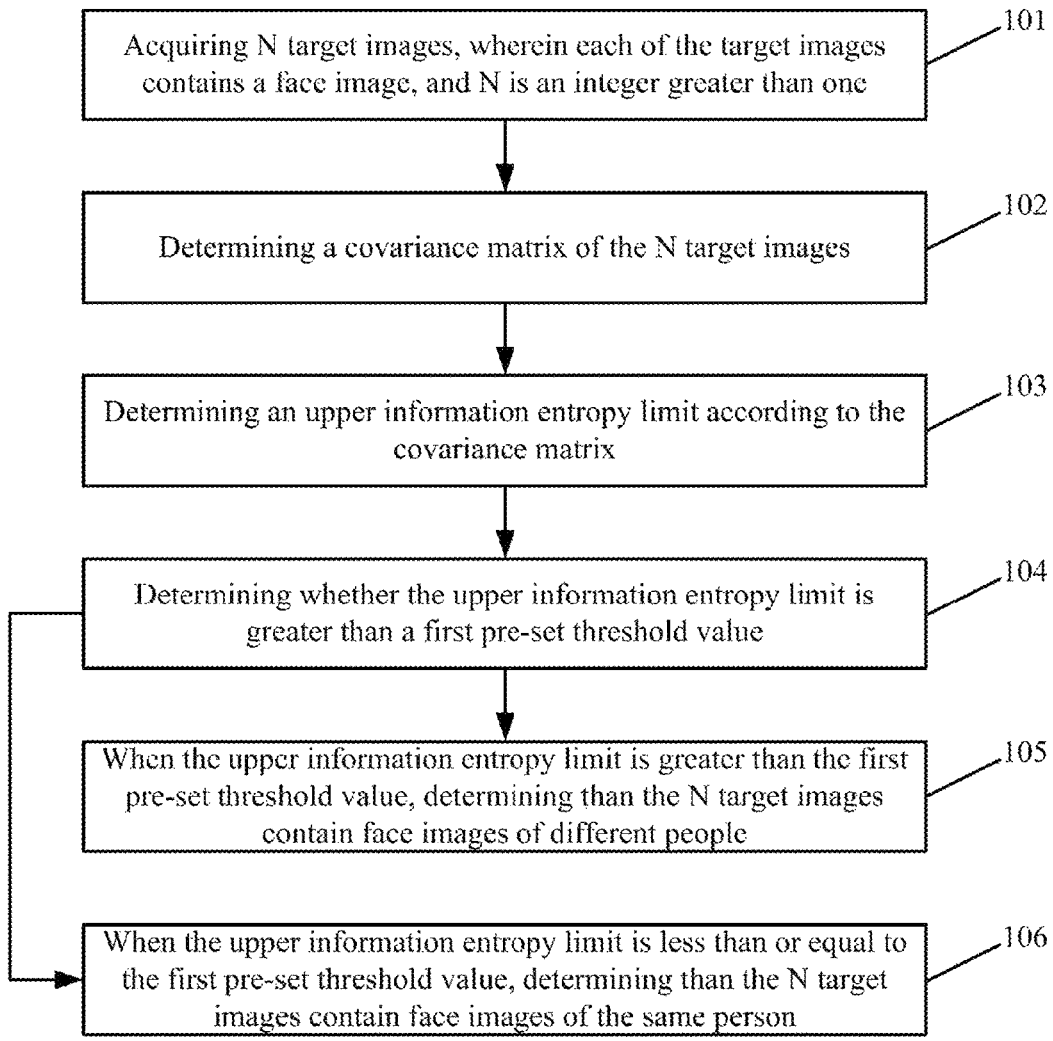
FIG. 1 is a flowchart of an image processing method provided in one embodiment of the present invention.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. Based on the embodiments of the invention, all other embodiments obtained by persons of ordinary skills in this field without creative work shall fall within the protection scope of the present disclosure.

The terms "first", "second", "third" and "fourth" in specification, claims and drawings of the present disclosure are used to distinguish different objects, but not used to describe a particular sequence. In addition, the terms "include" and "have" and any deformation thereof are intended to cover exclusive inclusions. For example, a process, method, system, product or device that contains a series of steps or units is not only limited to listed steps or units, but optionally includes steps or units not listed, or optionally includes other inherent steps or units for the processes, methods, products or devices.

The reference to "embodiments" in this invention means specific characteristics, structures or characters described in the embodiments can be included in at least one embodiment of the present invention. The term "embodiment" shown in various positions in the specification does not necessarily refer to the same embodiment, also does not refer to the embodiments that are independent and exclusive embodiments with other embodiments or alternative embodiments. It can be understood both explicitly and implicitly by persons of ordinary skills in this field that the embodiments described herein can be combined with other embodiment.

A terminal described in the embodiments of the disclosure may include a smart phone (such as an Android phone, a iOS phone, a Windows Phone, etc.), a tablet computer, a handheld computer, a laptop, a mobile internet device (MID) or a wearable device, etc., which is only an example, not exhaustive, and is not limited the terminals listed above.

It should be noted that, in practical applications, a metric (scalar) is often used to reflect the degree of difference between data. For example, for a group of given facial feature data, the degree of difference between the facial feature data can be used to determine whether the group of given facial feature data belong to the same person or not. For one-dimensional data, variance can be used as a metric to measure the degree of difference between data. For multidimensional data, covariance can be calculated correspondingly. The covariance exists in the form of matrix, and cannot be directly used as a metric (scalar). Thus, a metric method that can be used to measure the degree of difference between the multidimensional data is needed.

A method for measuring degree of difference between multidimensional data is provided in the embodiment of the disclosure, which can better retain information related to the degree of difference in a covariance matrix. Moreover, this method can reasonably explain the data of mixed Gaussian distribution in term of probability and informatics, and can be used to determine whether a set of (mixed Gaussian distribution) facial feature data belongs to the same person or not.

For the one-dimensional data, the variance is usually used, and the generalization of the variance on the multidimensional data is the covariance matrix. A matrix cannot be measured as a scalar, so that a method for effectively measuring degree of difference between multidimensional data is needed.

For example, the definition of variance can be expressed as follows:

$$Var(X) = E[(X-\mu)^2].$$

For the multidimensional data, the covariance matrix can be defined as follows:

$$\Sigma = \begin{bmatrix} E[(X_1-\mu_1)(X_1-\mu_1)] & E[(X_1-\mu_1)(X_2-\mu_2)] & \dots & E[(X_1-\mu_1)(X_n-\mu_n)] \\ E[(X_2-\mu_2)(X_1-\mu_1)] & E[(X_2-\mu_2)(X_2-\mu_2)] & \dots & E[(X_2-\mu_2)(X_n-\mu_n)] \\ \vdots & \vdots & \ddots & \vdots \\ E[(X_n-\mu_n)(X_1-\mu_1)] & E[(X_n-\mu_n)(X_2-\mu_2)] & \dots & E[(X_n-\mu_n)(X_n-\mu_n)] \end{bmatrix}$$

For a set of multidimensional data X, the degree of variance between data can be estimated by the following method. Firstly, the covariance matrix $\Sigma$ of the multidimensional data is calculated; the value det ($\Sigma$) (or any a monotone mapping, such as log (det ($\Sigma$))) of matrix determinant is used as the metric of the degree of variance between the data, and the larger the value det ($\Sigma$), the greater the degree of difference between the data. The theoretical explanation of this method and how to apply it to facial feature data based on mixed Gaussian model are given below.

Referring to FIG. 1, a flowchart of an image processing method provided in one embodiment of the present invention is described in detail as below. The image processing method in this embodiment of the present invention includes the following steps:

101, acquiring N target images, wherein each of the target images includes a face image, and N is an integer greater than one.

Each target image of the N target images can include one face image, and N is an integer greater than one.

Optionally, the N target images can have the same or partially the same format size.

Optionally, the format of the N target images can be the same or partially the same.

Optionally, the step of acquiring N target images can include the following steps:

11), acquiring M first images, wherein M is a positive integer;

12), performing image segmentation on the M first images to obtain the N target images.

In detail, M can be one or an integer greater than one, and when M is equal to one, it can be understood that one first image can include N target images. When M is greater than one, it can be understood that M first images include N target images. Understandably, the relationship between M and N can be: M greater than N, M=N, or M less than N. for example, when M is greater than N, it means that not every first image in M first images includes the face image. When M is equal to N, it means that each first image in M first images may include a face image. When M is less than N, it means that at least one first image include more than two face images. In a word, the M first images can include N face images. Therefore, the M first images can be segmented respectively, to acquire the N target images. Each target image in the N target images include a face image.

The image segmentation can adopt at least one of grayscale threshold segmentation, region growing, clustering analysis, wavelet transform, and maximum between-cluster variance algorithm (namely, OTSU method).

In one embodiment, the step of acquiring N target images can include the following steps:

13), acquiring N second images;

14), determining an image quality evaluation value of each of the N second images to obtain N image quality evaluation values;

15), performing image enhancement processing on the second images whose image quality evaluation values are less than a second pre-set threshold value, and keeping the second images whose image quality evaluation values are greater than or equal to the second pre-set threshold value to obtain the N target images.

Each of the N second images includes a face image, the image quality of each second image in the N second images can be evaluated to determine the image quality evaluation value of each of the N second images, thereby obtaining the N image quality evaluation values. Furthermore, when the image quality evaluation value i in the N image quality evaluation values is less than the second pre-set threshold value, then the second images corresponding to the image quality evaluation value i are performed the image enhancement processing, wherein the image quality evaluation value i can be any one of the N image quality evaluation values. When the image quality evaluation value j in the N image quality evaluation values is greater than or equal to the second pre-set threshold value, then the second images corresponding to the image quality evaluation value j are kept.

Optionally, at least one image quality evaluation index can be used to evaluate the image quality of the second images to obtain the image quality evaluation value. The image quality evaluation index can include but not limited to: average grey scale, standard deviation, entropy, edge-preserving index, SNR (signal to noise ratio), and so on.

Understandably, due to the limitation of using a single quality evaluation index to evaluate image quality, therefore, multiple image quality evaluation indexes can be used to evaluate the image quality. Of course, when the image quality is evaluated, the image quality evaluation indexes are not the more the better, that is, it is not that the more image quality evaluation indexes are used, the better the image quality will be. That is because the more the image quality evaluation are used, the higher the computational complexity during the image quality evaluation, thereby the effect of the image quality evaluation is not necessarily better. Thus, in the case of higher requirements for the image quality evaluation, 2 to 10 image quality evaluation indexes can be used to evaluate the image quality. It can be understood that the number of image quality evaluation indexes and which image quality evaluation indexes are selected should be determined according to the specific implementation situation. Of course, it is necessary to select the image quality evaluation indexes in combination with specific scenes. For example, the image quality evaluation indexes selected for image quality evaluation in dark environment can be different from those selected for image quality evaluation in bright environment.

In one embodiment, in the case of low requirements for image quality evaluation accuracy, an image quality evaluation index can be used to evaluate the image quality. For example, the entropy can be used to evaluate the image quality of the second image, the higher the entropy is, the better the image quality will be; on the contrary, the lower the entropy is, the worse the image quality will be.

In one embodiment, in the case of high requirements for image quality evaluation accuracy, multiple image quality evaluation indexes can be used to evaluate the second images. When multiple image quality evaluation indexes are used for image quality evaluation of the second images, the weight of each of multiple image quality evaluation indexes can be pre-set to obtain multiple image quality evaluation values, and a final image quality evaluation value can be obtained according to multiple image quality evaluation values and the weight of each image quality evaluation index. For example, three image quality evaluation indexes are: A, B and C, the weight of A is a1, the weight of B is a2, and the weight of C is a3; when the image quality evaluation indexes A, B and C are used for image quality evaluation on a certain image, the image quality evaluation value corresponding to A is b1, the image quality evaluation value corresponding to B is b2, and the image quality evaluation value corresponding to C is b3, so the final image quality evaluation value is a1b1+a2b2+a3b3. Generally, the higher the image quality evaluation value is, the better the image quality will be.

Optionally, the step of evaluating the image quality of the second images to obtain the image quality evaluation value, may include:

A), selecting face image areas in the second images;

B), determining the number of feature points in the face image areas;

C), comparing the number of feature points with the number of pre-set feature points to obtain a ratio, and taking the ratio as the image quality evaluation value of the second image.

In detail, because the second images may not only include target areas, any may also include other areas, therefore, part of the second images can be selected as the target areas. For example, the center of the second image can be taken as a dot, and the area within a certain range near the dot can be taken as the target area. There is a high probability that the targets exist in the target area, that is, when image recognition is carried out in the target area, the probability of getting the targets that the user wants is relatively large, therefore improving the recognition speed. In step B, feature point extraction is performed in the target area in order to obtain the number of the feature points of the target area, that is, the feature points in the target area can be extracted to obtain the number of the feature points in the target area. In one embodiment, feature point extraction can be: Harris corner extraction, scale invariant feature transform (SIFT), etc. The number of pre-set feature points can be predetermined by the user or be the system default, and the ratio between the number of feature points in the target area and the number of pre-set feature points can be taken as the image quality evaluation value.

102, determining a covariance matrix of the N target images.

In detail, the covariance matrix of the N target images can be calculated. Specifically, the N target images are performed for feature extraction to obtain N feature data sets, and each target image in the N target images corresponds to a feature data set. Thus, the covariance matrix of the N target images can be determined according to the N feature data sets. The way of the feature extraction can be, but not limited to: neural network algorithm, genetic algorithm, machine learning algorithm, Harris corner detection algorithm, etc.

Optionally, the step of determining a covariance matrix of the N target images, includes:

21), extracting feature data of each target image in the N target images respectively to obtain N Gaussian distribution feature data;

22), calculating the covariance matrix according to the N Gaussian distribution feature data.

The feature data of each target image in the N target images can be extracted respectively to obtain the N Gaussian distribution feature data, that is, each target image can correspond to one of the Gaussian distribution feature data. The covariance matrix can be calculated according to the N Gaussian distribution feature data. The way of extracting feature data in step 21 can be: neural network algorithm, genetic algorithm, machine learning algorithm, Harris corner detection algorithm, etc.

Optionally, the step of determining a covariance matrix of the N target images, includes:

23), carrying out target segmentation for the N target images respectively to obtain the N face images;

24), determining the covariance matrix of the N face images.

In detail, each target image of the N target images can not only include face image areas, can also include other areas, therefore, each target image of the N target images can be segmented to obtain the N face images. Thus, one face image can be obtained in each target image, thereby obtaining N face images. The feature data of each face image in the N face images can be extracted to obtain the N feature data, that is, each face image can correspond to one of the feature data. The covariance matrix can be calculated according to the feature data.

103, determining an upper information entropy limit according to the covariance matrix.

In general, entropy is used to represent the degree of data chaos in informatics. Entropy is defined as:

$$H(X) = \int P(x)I(x)dx = -\int P(z)\log_b P(x)dx,$$

wherein, P(x) represents the distribution of data, for a given covariance matrix $\Sigma$, Gaussian distribution is a distribution which can make the upper information entropy limit maximization. That is, when P(x) is the Gaussian distribution, the information entropy G(x) is the upper limit of the entropy H(x):

$$G(X) = \frac{1}{2}\ln\{(2\pi e)^N \det(\Sigma)\} \geq H(X),$$

wherein, G(x) is a monotone function of the determinant det ($\Sigma$), that is, the larger the value of covariance matrix determinant is, the higher the upper information entropy limit will be.

Optionally, the upper information entropy limit can be a specific value, and can be other variation forms, or an upper information entropy limit function or its characteristics (such as monotonicity), such as log(A), where A is the specific value of the upper information entropy limit.

After step 103, it can be assumed that each feature data of the N feature data satisfies the Gaussian distribution, then step 104 can be executed under this premise.

For face image data, a common problem is, for a given set of images, how to determine whether the set of images belongs to the same person. Different images are not suitable for being directly analyzed due to their different resolutions. Face image feature extraction method can be used to represent a face image with a multi-dimensional vector. Similarly, the upper information entropy limit can be used to evaluate whether these features belong to the same person or not. In an ideal situation, the entropy H(X) can be directly figured out hopefully, and be determined by using the following method. When the entropy H(X) is greater than a threshold value t, it can be considered that the degree of data chaotic is high, which indicates that the feature data does not belong to the same person.

In practice, however, it is difficult to know the true distribution of P(x), so the above method cannot be directly applied. Suppose that for different images of the same person, the feature data complies with multivariate Gaussian distribution. So for the feature data of any group of images, they comply with Gaussian distribution (including one person), or comply with Gaussian mixture distribution (including more than one person). When all the images belong to the same person, then H(X)=G(X); when the images belong to more than one person, then H(X)<G(X).

Therefore, for a given set of face feature data X, the following alternative method can be used to calculate the upper information entropy limit G(X) of the given set of face feature data X. When G(X) is greater than the threshold value t, it can be considered that this given set of face feature data X does not belong to the same person. The difference between this method and the method based on H(X) is: because G(X) is greater than or equal to H(X), so when G(X) is greater than the threshold value t, it is possible that H(X) is less than or equal to the threshold value t. but according to the previous assumption, only when they belong to different people, H(X)<G(X), so it can be considered than in this case the data does not belong to the same person. Thus, under the assumption of "the feature data of different images of the same person complies with multivariate Gaussian distribution", this method is equivalent to or even superior to the method based on the real information entropy of the data.

104, determining whether the upper information entropy limit is greater than a first pre-set threshold value.

The first pre-set threshold value can be predetermined by the user or be the system default. Of course, in one embodiment, the first pre-set threshold value can be an empirical value.

105, determining that the N target images include face images of different people when the upper information entropy limit is greater than the first pre-set threshold value.

106, determining that the N target images include face images of the same person when the upper information entropy limit is less than or equal to the first pre-set threshold value.

In detail, when the upper information entropy limit is greater than the first pre-set threshold value, it can be determined that the N target images include face images of different people. When the upper information entropy limit is less than or equal to the first pre-set threshold value, it can be determined that the N target images include face images of the same person.

For example, in practice, when each target image in the N target images is the face image, then the N target images form a group of images. The feature data of each target image in the N target images can be extracted to obtain N feature data, then the covariance matrix of the N target images can be determined according to the N feature data. The upper information entropy limit can be calculated according to the covariance matrix, and then the upper information entropy is determined to be greater than a first pre-set threshold value. When the upper information entropy limit is greater than the first pre-set threshold value, it can be determined that the face images in the N target images are different people. When the upper information entropy limit is less than or equal to the first pre-set threshold value, it can be determined that the face images in the N target images are the same person. Thus, the N target images can correspond to one tag, such as passer-by A. When the face images in the N target images are different people, the tag is wrong; when the face images in the N target images are the same person, the tag is correct.

In one embodiment, after step 102, the trace of the covariance matrix can be directly calculated, which is equivalent to the sum of the variances of each dimension. The method of superposing each of the dimensions linearly would lose the correlation information among the dimensions, and there is no intuitive theoretical explanation. The trace of the covariance matrix is described as follows.

For example, assuming that there is a set of two-dimensional data, the variance of a first dimension is a, and the variance of a second dimension is b. If the first dimension and the second dimension are independent, then the covariance matrix is $$\begin{vmatrix} a & 0 \\ 0 & b \end{vmatrix};$$

and the trace if the covariance matrix is a+b. If the first dimension and the second dimension are related to each other, then the elements besides the diagonal will no longer be equal to zero, but at the same time, the trace if the covariance matrix is still a+b. Therefore, the trace cannot well reflect the correlation information among the dimensions.

Moreover, there is no intuitive probability or informatics explanation for linear addition of variances of each dimension (even for independent data among dimensions). Thus, it is difficult to determine the applicability and limitations of this method.

In one embodiment, the embodiment of the invention is adopted to determine whether the face images in a group of images (such as, the above-mentioned N target images) belong to the same person, which has a higher recognition accuracy, can better retain the information related to the degree of difference in the covariance matrix, and has a reasonable explanation for mixed Gaussian distribution data in probability and informatics. The method mentioned above combined with the method of face feature extraction can be used to determine whether a group of face images (mixed Gaussian distribution) belong to the same person and clear face image data set and other problems.

In one embodiment, the following conditions may also be included after step 104. For example, the N target images correspond to a target tag. After the step 103 of determining an upper information entropy limit according to the covariance matrix, the image processing method further includes:

evaluating the accuracy of the target tag according to the upper information entropy limit.

In detail, the upper information entropy limit can be compared with a second pre-set threshold value. When the upper information entropy limit is less than the second pre-set threshold value, it means that the target tag is correct; when the upper information entropy limit is greater than or equal to the second pre-set threshold value, it means that the target tag is incorrect. It should be understood that the second pre-set threshold value is different from the first pre-set threshold value. Generally, the second pre-set threshold can be the default experience value of the system, or can be set by the user.

The image processing method of the embodiment includes: acquiring N target images, wherein each of the target images includes a face image, and N is an integer greater than one; determining a covariance matrix of the N target images; determining an upper information entropy limit according to the covariance matrix; determining whether the upper information entropy limit is greater than a first pre-set threshold value; when the upper information entropy limit is greater than the first pre-set threshold value, determining that the N target images include face images of different people; when the upper information entropy limit is less than or equal to the first pre-set threshold value, determining that the N target images include face images of the same person. By means of the method, it can be determined whether the faces in a group of images are from the same person.

Figure 2:
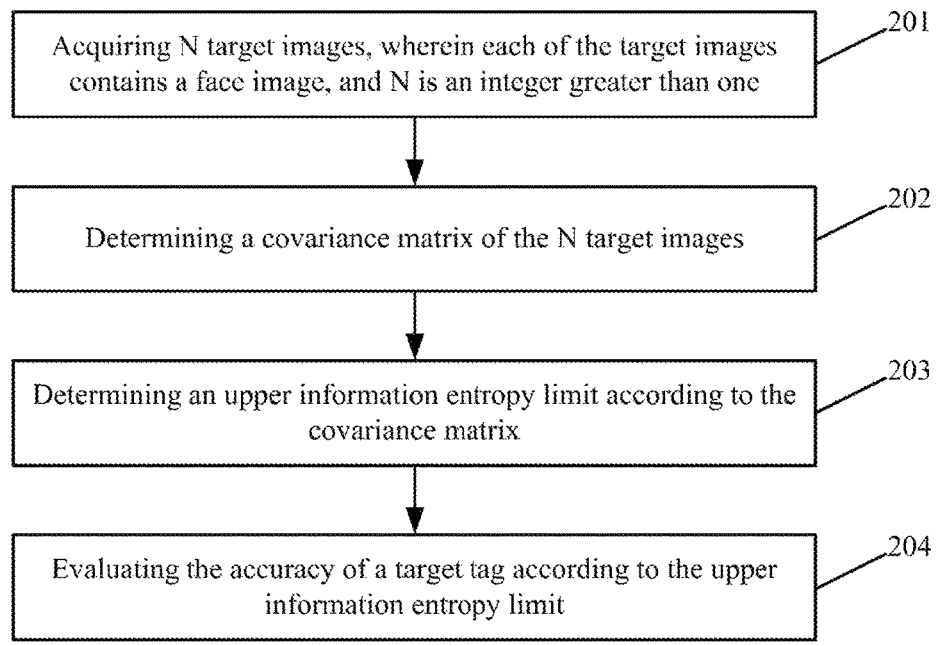
FIG. 2 is a flowchart of an image processing method provided in another embodiment of the present invention.

Referring to FIG. 2, FIG. 2 is a flowchart of an image processing method provided in another embodiment of the present invention. The image processing method in this embodiment includes the following steps:

201, acquiring N target images, wherein each of the target images includes a face image, an N is an integer greater than one.

202, determining a covariance matrix of the N target images.

203, determining an upper information entropy limit according to the covariance matrix.

The above steps 201-203 are the same as the steps 101-103 of the image processing method as described in FIG. 1, so that the specific content of steps 201-203 can refer to the corresponding steps 101-103 in the embodiment of FIG. 1 as described above.

204, evaluating the accuracy of the target tag according to the upper information entropy limit.

In detail, the upper information entropy limit can be compared with a second pre-set threshold value. When the upper information entropy limit is less than the second pre-set threshold value, it means that the target tag is correct; when the upper information entropy limit is greater than or equal to the second pre-set threshold value, it means that the target tag is incorrect. Generally, the second pre-set threshold can be the default experience value of the system, or can be set by the user.

In one embodiment, the trace of the covariance matrix can be directly calculated, which is equivalent to the sum of the variances of each dimension. The method of superposing each of the dimensions linearly would lose the correlation information among the dimensions, and there is no intuitive theoretical explanation. However, the embodiment of the invention is adopted to evaluate the accuracy of the target tag in a group of images (such as, the above-mentioned N target images), which has a higher evaluation accuracy, can better retain the information related to the degree of difference in the covariance matrix, and has a reasonable explanation for mixed Gaussian distribution data in probability and informatics. The method mentioned above combined with the method of face feature extraction can be used to evaluate the accuracy of the target tag in a group of images (which conform to the mixed Gaussian distribution).

In one embodiment, after the step 204, the image processing method further includes the following steps:

deleting the N target images when the accuracy is lower than a third pre-set threshold value;

retaining the N target images when the accuracy is higher than or equal to the third pre-set threshold value.

In detail, the third pre-set threshold value can be predetermined by the user or be the system default. The N target images can be equivalent to a data set, and an accuracy can be obtained after step 204. When the accuracy is lower than the third pre-set threshold value, the N target images can be deleted, and when the accuracy is higher than or equal to the third pre-set threshold value, the N target images can be retained. In practical application, if there are M data sets, each data set can correspond to one accuracy, then there are M accuracy. In the M accuracy, if a certain accuracy is lower than the third pre-set threshold value, the data set whose accuracy is lower than the third pre-set threshold value will be deleted; if a certain accuracy rate is higher than or equal to the third pre-set threshold value, the data set corresponding to that accuracy rate will be retained.

In this embodiment, the image processing method includes: acquiring N target images, where each of the target images include a face image, and N is an integer greater than one; determining a covariance matrix of the N target images; determining an upper information entropy limit according to the covariance matrix; and evaluating the accuracy of tags corresponding to a set of target images according to the upper information entropy limit. Therefore, the method can improve the accuracy of target image evaluation.

The following embodiments provide a device used to implement the image processing method as described below.

Figure 3:
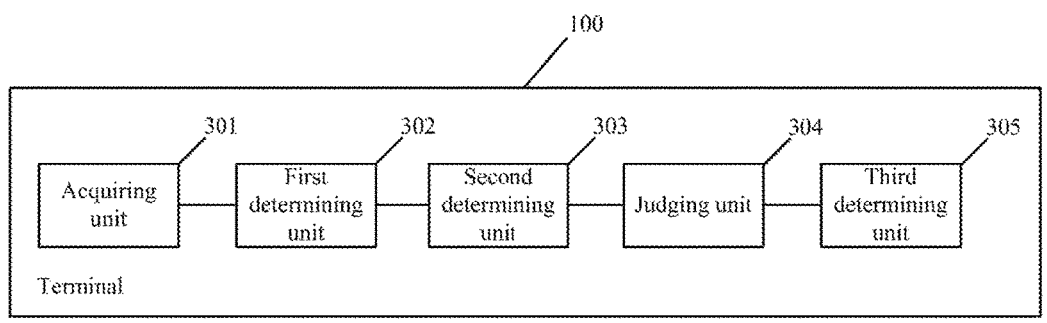
FIG. 3 is a block diagram of a terminal provided in one embodiment of the present invention.

Referring to FIG. 3, FIG. 3 is a block diagram of a terminal 100 provided in one embodiment of the present invention. The terminal 100 in this embodiment includes: an acquiring unit 301, a first determining unit 302, a second determining unit 303, a judging unit 304 and a third determining unit 305. In detail:

the acquiring unit 301 is configured to acquire N target images, wherein each of the target images includes a face image, and N is an integer greater than one;

the first determining unit 302 is configured to determine a covariance matrix of the N target images;

the second determining unit 303 is configured to determine an upper information entropy limit according to the covariance matrix;

the judging unit 304 is configured to determine whether the upper information entropy limit is greater than a first pre-set threshold value;

the third determining unit 305 is configured to determine that the N target images include face images of different people when the judging unit 304 determines that the upper information entropy limit is greater than the first pre-set threshold value;

the third determining unit 305 is further configured to determine that the N target images include face images of the same person when the judging unit 304 determines that the upper information entropy limit is less than or equal to the first pre-set threshold value.

Figure 4:
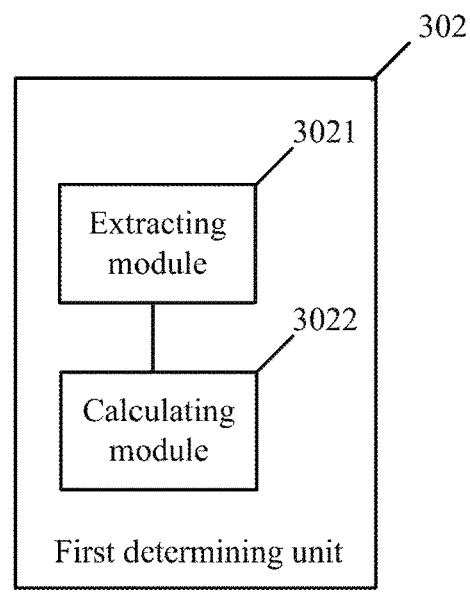
FIG. 4 is a block diagram of a first determining unit as shown in FIG. 3 provided in one embodiment of the present invention.

In one embodiment, referring to FIG. 4, FIG. 4 is a block diagram of a first determining unit 302 as shown in FIG. 3 provided in one embodiment. The first determining unit 302 includes: an extracting module 3021 and a calculating module 3022. In detail:

the extracting module 3021 is configured to extract feature data of each target image in the N target images respectively to obtain N feature data;

the calculating module 3022 is configured to calculate the covariance matrix according to the N feature data.

Figure 5:
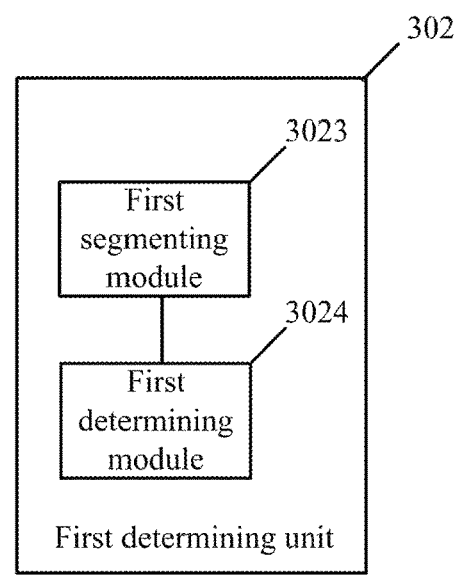
FIG. 5 is a block diagram of a first determining unit as shown in FIG. 3 provided in another embodiment of the present invention.

In one embodiment, referring to FIG. 5, FIG. 5 is a block diagram of a first determining unit 302 as shown in FIG. 3. In this embodiment, The first determining unit 302 includes: a first segmenting module 3023 and a first determining module 3024. In detail:

the first segmenting module 3023 is configured to carry out target segmentation for the N target images respectively to obtain the N face images; that is, the first segmenting module 3023 is configured to segment the N target images respectively to obtain the N face images;

the first determining module 3024 is configured to determine the covariance matrix of the N face image.

Figure 6:
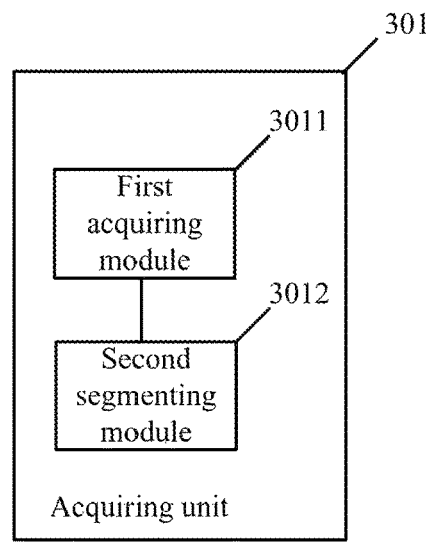
FIG. 6 is a block diagram of an acquiring unit as shown in FIG. 3 provided in one embodiment of the present invention.

Referring to FIG. 6, FIG. 6 is a block diagram of an acquiring unit 301 as shown in FIG. 3 provided in one embodiment of the present invention. In this embodiment, the acquiring unit 301 includes: a first acquiring module 3011 and a second segmenting module 3012. In detail:

the first acquiring module 3011 is configured to acquire M first images, wherein M is a positive integer;

the second segmenting module 3012 is configured to perform image segmentation on the M first images to obtain the N target images; that is, the second segmenting module 3012 is configured to segmenting the M first images to obtain the N target images.

Figure 7:
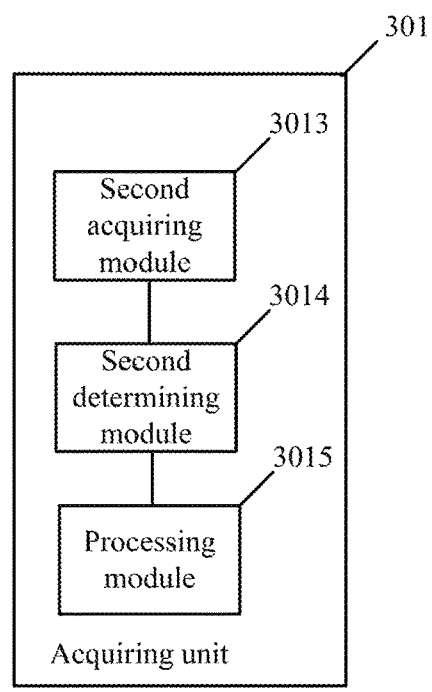
FIG. 7 is a block diagram of an acquiring unit as shown in FIG. 3 provided in another embodiment of the present invention.

Referring to FIG. 7, FIG. 7 is a block diagram of an acquiring unit 301 as shown in FIG. 3 provided in another embodiment of the present invention. In this embodiment, the acquiring unit 301 includes: a second acquiring module 3013, a second determining module 3014 and a processing module 3015. In detail:

the second acquiring module 3013 is configured to acquire N second images;

the second determining module 3014 is configured to determine an image quality evaluation value of each of the N second images to obtain N image quality evaluation values;

the processing module 3015 is configured to perform image enhancement processing on the second images whose image quality evaluation values are less than a second pre-set threshold value, and keeping the second images whose image quality evaluation values are greater than or equal to the second pre-set threshold value to obtain the N target images.

In one embodiment, the N target images correspond to a target tag. The terminal 100 further includes: an assessment unit (no shown). In detail:

the assessment unit is configured to evaluate the accuracy of the target tag according to the upper information entropy limit after determining an upper information entropy limit according to the covariance matrix.

In one embodiment, the terminal 100 further includes: a processing unit (no shown). In detail:

the processing unit is configured to delete the N target images when the accuracy is lower than a third pre-set threshold value, and retain the N target images when the accuracy is higher than or equal to the third pre-set threshold value after the assessment unit evaluates the accuracy of the target tag according to the upper information entropy limit.

The terminal 100 is configured to acquire N target images, wherein each of the target images includes a face image, and N is an integer greater than one; determine a covariance matrix of the N target images; determine an upper information entropy limit according to the covariance matrix; determine whether the upper information entropy limit is greater than a first pre-set threshold value; when the upper information entropy limit is greater than the first pre-set threshold value, determine that the N target images include face images of different people; when the upper information entropy limit is less than or equal to the first pre-set threshold value, determine that the N target images include face images of the same person. By means of the terminal 100, it can be determined whether the faces in a group of images are from the same person.

Figure 8:
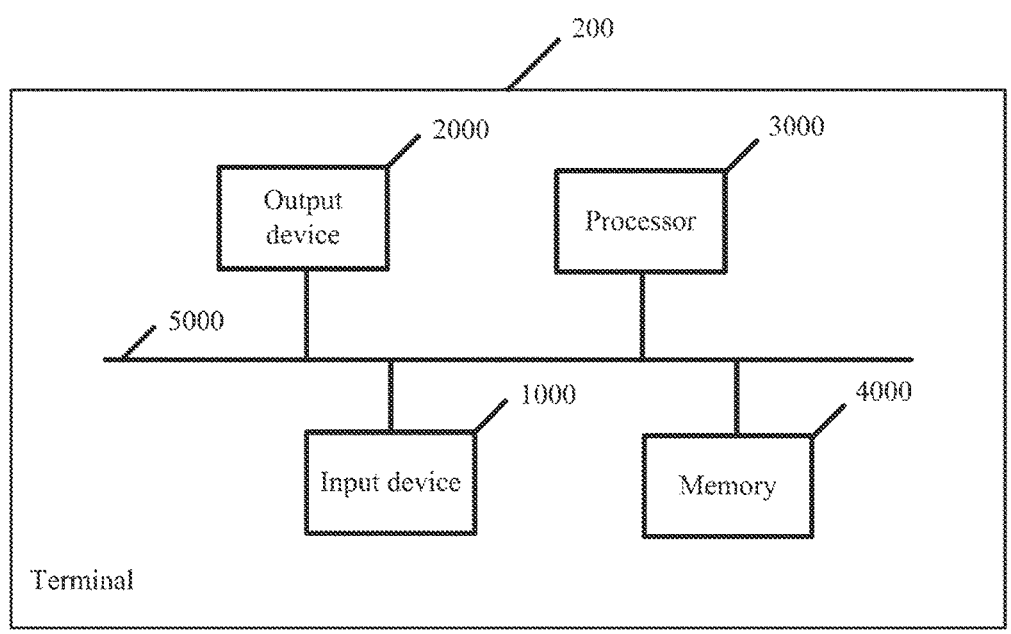
FIG. 8 is a block diagram of a terminal provided in another embodiment of the present invention.

Referring to FIG. 8, FIG. 8 is a block diagram of a terminal 200 provided in another embodiment of the present invention. In this embodiment, the terminal 200 includes: at least one input device 1000, at least one output device 2000, at least one processor 3000, such as a CPU, and a memory 4000. The input device 1000, the output device 2000, the processor 3000 and the memory 4000 are connected by a bus 5000.

In this embodiment, the input device 1000 can be a touch panel, a physical button or a mouse.

The output device 2000 can be a display screen.

The memory 4000 can be a high-speed RAM memory, can also be a non-volatile memory, such as a magnetic disk storage. The memory 4000 is used to store a group of program codes, and the input device 1000, the output device 2000 and the processor 3000 are used to call the program codes stored in the memory 4000 and perform the following operations:

The processor 3000 is configured to execute the program codes for:

acquiring N target images, wherein each of the target images includes a face image, and N is an integer greater than one;

determining a covariance matrix of the N target images;

determining an upper information entropy limit according to the covariance matrix;

determining whether the upper information entropy limit is greater than a first pre-set threshold value;

determining that the N target images include face images of different people when the upper information entropy limit is greater than the first pre-set threshold value; and determining that the N target images include face images of the same person when the upper information entropy limit is less than or equal to the first pre-set threshold value.

In one embodiment, the program codes for determining a covariance matrix of the N target images are executed by the processor 3000 for:

extracting feature data of each target image in the N target images respectively to obtain N feature data; and calculating the covariance matrix according to the N feature data.

In one embodiment, the program codes for determining a covariance matrix of the N target images are executed by the processor 3000 for:

carrying out target segmentation for the N target images respectively to obtain the N face images; and determining the covariance matrix of the N face image.

In one embodiment, the program codes for acquiring N target images are executed by the processor 3000 for:

acquiring M first images, wherein M is a positive integer; and performing image segmentation on the M first images to obtain the N target images.

In one embodiment, the program codes for acquiring N target images are executed by the processor 3000 for:

acquiring N second images;

determining an image quality evaluation value of each of the N second images to obtain N image quality evaluation values; and performing image enhancement processing on the second images whose image quality evaluation values are less than a second pre-set threshold value, and keeping the second images whose image quality evaluation values are greater than or equal to the second pre-set threshold value to obtain the N target images.

In one embodiment, the N target images correspond to a target tag.

after the program codes are executed for determining an upper information limit according to the covariance matrix, the program codes are further executed by the processor 3000 for:

evaluating the accuracy of the target tag according to the upper information entropy limit.

In one embodiment, after the program codes are executed for evaluating the accuracy of the target tag according to the upper information entropy limit, the program codes are further executed by the processor 3000 for:

deleting the N target images when the accuracy is lower than a third pre-set threshold value; and retaining the N target images when the accuracy is higher than or equal to the third pre-set threshold value.

The embodiment of the invention also provides a computer storage medium in which a program may be stored, and the execution of the program includes part or all steps of any of the image processing methods recorded in the embodiments.

Although the invention is described herein in combination with each embodiment above, other variations of the embodiments may be understood and realized by a person having ordinary skills in the field by viewing the figured, disclosed contents and the claims in the process of implementing the invention. In claims, the word "comprising" does not exclude the other steps of components, "a" or "an" does not exclude the multiple. A single processor or other unit may implement several functions enumerated in the claims. although some technical features are recorded in different dependent claims, this does not means that these technical features cannot be combined to produce good results.

A person having ordinary skills in the field can understand that embodiments of the invention may be provided as methods, devices (equipments), or computer program products. Therefore, the invention may take the form of full hardware embodiments, full software embodiments, or embodiments combining software and hardware aspects. Furthermore, the present invention may take the form of a computer program product implemented on one or more computer available storage media (including but not limited to magnetic disk storage, CD-ROM, optical memory, etc.) including computer available program codes. Computer programs are stored/distributed in suitable storage medium, provided with or as part of other hardware, and may also be distributed in other forms, such as the Internet or other wired or wireless telecommunications systems.

The present invention is described by reference to the method, device (equipment) and flow chart and/or block diagram of a computer program product of an embodiment of the present invention. Each flow and/or box in the flowchart and/or block diagram, and the combination of flow and/or box in the flowchart and/or block diagram, shall be understood to be implemented by computer program instructions. The computer program instructions can be provided to a general purpose computer, a special purpose computer, an embedded processor or processors of other programmable data processing devices to produce a machine, making the instructions executed by the processors of the computer or other programmable data processing devices to produce a device used to implement the designated function of a flow or multiple flow in a flow chart and/or a box or multiple box in a block diagram.

These computer program instructions can also be stored in the computer readable storage which can boot a computer or other programmable data processing equipment in a particular way to work, making the instructions stored in the computer readable storage produce manufactures including command devices, the command devices can implement the designated function of a flow or multiple flow in a flow chart and/or a box or multiple box in a block diagram.

The computer program instructions can be loaded into a computer or other programmable data processing equipment, making the computer or other programmable devices to perform a series of operating steps to produce the processing of computer implementation, therefore the instructions executed on a computer or other programmable devices can provide the steps for implementing the designated function of a flow or multiple flow in a flow chart and/or a box or multiple box in a block diagram.

Although the invention is described in combination with specific features and embodiments, it is evident that it can be modified and combined in various ways without departing from the spirit and scope of the invention. Accordingly, this specification and accompanying drawings are only exemplary descriptions of the invention as defined by the claims and are deemed to cover any and all modifications, variations, combinations or equivalents within the scope of the invention. The foregoing descriptions are merely exemplary embodiments of the present invention, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

The invention claimed is:

1. An image processing method, comprising:
acquiring N target images, wherein each of the target images comprises a face image, and N is an integer greater than one;
determining a covariance matrix of the N target images;
determining an upper information entropy limit according to the covariance matrix;
determining whether the upper information entropy limit is greater than a first pre-set threshold value;
when the upper information entropy limit is greater than the first pre-set threshold value, determining that the N target images comprise face images of different people; and
when the upper information entropy limit is less than or equal to the first pre-set threshold value, determining that the N target images comprise face images of the same person.

2. The image processing method of claim 1, the step of determining a covariance matrix of the N target images, comprising:
extracting feature data of each target image in the N target images respectively to obtain N feature data;
calculating the covariance matrix according to the N feature data.

3. The image processing method of claim 1, the step of determining a covariance matrix of the N target images, comprising:
carrying out target segmentation for the N target images respectively to obtain the N face images;
determining the covariance matrix of the N face images.

4. The image processing method of claim 1, the step of acquiring N target images, comprising:
acquiring M first images, wherein M is a positive integer;
performing image segmentation on the M first images to obtain the N target images.

5. The image processing method of claim 1, the step of acquiring N target images, comprising:
acquiring N second images;
determining an image quality evaluation value of each of the N second images to obtain N image quality evaluation values;
performing image enhancement processing on the second images whose image quality evaluation values are less than a second pre-set threshold value, and keeping the second images whose image quality evaluation values are greater than or equal to the second pre-set threshold value to obtain the N target images.

6. The image processing method of claim 1, wherein the N target images correspond to a target tag; after the step of determining an upper information entropy limit according to the covariance matrix, further comprising:
evaluating the accuracy of the target tag according to the upper information entropy limit.

7. The image processing method of claim 6, after the step of evaluating the accuracy of the target tag according to the upper information entropy limit, further comprising:
deleting the N target images when the accuracy is lower than a third pre-set threshold value;
retaining the N target images when the accuracy is higher than or equal to the third pre-set threshold value.

8. A terminal, comprising:
an acquiring unit, configured to acquire N target images, wherein each of the target images comprises a face image, and N is an integer greater than one;
a first determining unit, configured to determine a covariance matrix of the N target images;
a second determining unit, configured to determine an upper information entropy limit according to the covariance matrix;
a judging unit, configured to determine whether the upper information entropy limit is greater than a first pre-set threshold value;
a third determining unit, configured to determine that the N target images comprise face images of different people when the judging unit determines that the upper information entropy limit is greater than the first pre-set threshold value;
the third determining unit, further configured to determine that the N target images comprise face images of the same person when the judging unit determines that the upper information entropy limit is less than or equal to the first pre-set threshold value.

9. The terminal of claim 8, the first determining unit comprising:
an extracting module, configured to extract feature data of each target image in the N target images respectively to obtain N feature data;
a calculating module, configured to calculate the covariance matrix according to the N feature data.

10. The terminal of claim 8, the first determining unit comprising:
a first segmenting module, configured to segment the N target images respectively to obtain the N face images;
a first determining module configured to determine the covariance matrix of the N face image.

11. A terminal, comprising a processor, the processor configured to execute a computer program stored in a memory to implement:
acquiring N target images, wherein each of the target images comprises a face image, and N is an integer greater than one;
determining a covariance matrix of the N target images;
determining an upper information entropy limit according to the covariance matrix;
determining whether the upper information entropy limit is greater than a first pre-set threshold value;
when the upper information entropy limit is greater than the first pre-set threshold value, determining that the N target images comprise face images of different people; and
when the upper information entropy limit is less than or equal to the first pre-set threshold value, determining that the N target images comprise face images of the same person.

* * * * *